US006573840B1

(12) United States Patent
Norman et al.

(10) Patent No.: US 6,573,840 B1
(45) Date of Patent: Jun. 3, 2003

(54) SUPERVISION AND CONTROL OF AIRPORT LIGHTING AND GROUND MOVEMENTS

(75) Inventors: Rolf Norman, Katrineholm (SE); Goran Backstrom, Ostersund (SE); Lars Millgard, Ostersund (SE)

(73) Assignee: Airport Technology in Scandinavia, Malmö (SE)

( * ) Notice: Subject to any disclaimer, the term of this patent is extended or adjusted under 35 U.S.C. 154(b) by 0 days.

(21) Appl. No.: 08/814,692

(22) Filed: Mar. 11, 1997

Related U.S. Application Data

(63) Continuation of application No. 08/382,382, filed on Feb. 1, 1995, now abandoned, which is a continuation of application No. 08/007,581, filed on Jan. 22, 1993, now Pat. No. 5,426,429, which is a continuation of application No. 07/678,297, filed on Apr. 29, 2001, now Pat. No. 5,243,340.

(30) Foreign Application Priority Data

Oct. 9, 1989 (SE) ................................ PCT/SE89/00546
Oct. 7, 1998 (SE) ............................................ 8803565

(51) Int. Cl.[7] .................................................. B64F 1/18
(52) U.S. Cl. ......................... 340/953; 315/13; 340/933; 340/947; 340/642
(58) Field of Search ................................ 340/953, 933, 340/947, 945, 961, 958, 988, 642, 309.4, 286.01, 286.02, 332, 502, 931, 825.07; 364/461; 244/114 R; 362/62; 324/207.13, 207.22, 226; 315/130

(56) References Cited

U.S. PATENT DOCUMENTS 3,114,892 A * 12/1963 Finch ......................... 340/953
3,122,721 A 2/1964 Liu et al.
3,152,315 A 10/1964 Rodgers et al.
3,178,683 A * 4/1965 Phelps ........................ 340/941
3,531,765 A 9/1970 Christianson et al. ........ 340/953
3,641,487 A 2/1972 Rogers et al.

(List continued on next page.)

FOREIGN PATENT DOCUMENTS

| | | |
|---|---|---|
| DE | 938079 | 7/1955 |
| DE | 2027989 | 12/1971 |
| DE | 1424802 | 2/1976 |
| DE | 3635682 | 4/1988 |
| DE | 3703830 | 8/1988 |
| EP | 0060068 | 9/1982 |
| EP | 0069470 | 1/1983 |
| GB | 2174852 | 11/1986 |
| GB | 0284592 | 9/1988 |

OTHER PUBLICATIONS

"The Swedish Approach to Airfield Lighting Control", N.Goran Eriksson, Nov. 14–15, 1990, Sixth Annual Airport Conference, pp. 49–55.*

*Primary Examiner*—Brent A. Swarthout
(74) *Attorney, Agent, or Firm*—Blank Rome, LLP

(57) ABSTRACT

In an arrangement for supervising and controlling field light units (20) at an airport, a regulator provided with a monitoring unit for power supply and for monitoring the light units is arranged individually for each light unit (18,20) to regulate the light intensity of the light units and to receive information as to their operational status. In a preferred embodiment, each light unit comprises two separate light sources that can be alternately and separately connected into circuit in case of failure to either of the light sources. Each light unit is provided with an electronic unit including a regulator, monitoring unit, and modem for power supply to the light unit and for monitoring the operation of the light unit. Each light unit is individually addressable from a control central for the airport. A ground traffic control system can be integrated into the field lighting system by connecting suitable presence detectors to the system.

14 Claims, 8 Drawing Sheets

U.S. PATENT DOCUMENTS 3,706,969 A * 12/1972 Paredes ...................... 340/958
3,715,741 A 2/1973 McWade et al.
3,771,120 A 11/1973 Bonazoli et al.
3,801,794 A 4/1974 Mauch et al.
3,819,980 A 6/1974 Mullersman
3,925,704 A * 12/1975 Camic ........................ 340/953
4,095,139 A 6/1978 Symonds et al.
4,216,413 A * 8/1980 Plas ...................... 340/310.01
4,313,063 A 1/1982 McHerron .................. 340/953
4,388,567 A 6/1983 Yamazaki et al.
4,418,333 A 11/1983 Schwarzbach et al.
4,449,073 A 5/1984 Mongoven et al. ......... 340/642
4,481,516 A 11/1984 Michelotti .................. 340/953
4,590,471 A 5/1986 Pieroway .................... 340/947
4,939,505 A 7/1990 Cappellini et al.
4,951,046 A 8/1990 Lambert et al.
5,032,961 A 7/1991 Pouyanne et al.
5,034,659 A 7/1991 Taniguchi ................... 340/642
5,095,502 A 3/1992 Finzel ........................ 340/642
5,239,236 A * 8/1993 Bäckström et al. ......... 315/187
5,243,340 A 9/1993 Norman et al. ............. 340/953
5,359,325 A * 10/1994 Ford et al. .................. 340/953

* cited by examiner

SUPERVISION AND CONTROL OF AIRPORT LIGHTING AND GROUND MOVEMENTS

This is a file-wrapper-continuation, of U.S. patent application Ser. No. 08/382,382, filed Feb. 1, 1995, now abandoned which was a continuation of U.S. patent application Ser. No. 08/007/581, now U.S. Pat. No. 5,426,429, filed Jan. 22, 1993, which was a continuation of Ser. No. 07/678,297, filed Apr. 29, 1991, now U.S. Pat. No. 5,243,340.

BACKGROUND OF THE INVENTION

The present invention relates to a method and a plant for supervising and controlling field lighting at an airport, and which optionally include presence detectors.

The traditional implementation of a system for field lights is as follows.

High-intensive and low-intensive lightings along approach paths, runways and taxiways are supplied from one or more supply points, so-called cabinets or stations situated in the airport field, usually two for a field with one runway. These supply points are fed with high voltage unregulated electricity which is transformed down to 380/320 V and the supply points contain regulator equipment, thyristor or transducer regulators or regulating transformers for converting the unregulated electricity into controlled, regulated electric power for supplying the light units, which takes place via several power supply loops. Supply takes place in two principally different ways, i.e. by series of parallel feed to the lightings. Each lighting is provided with a transformer for retransformatting the electricity to a suitable low voltage for supplying the lighting with power, in addition, the supply points also contain a supervisory system which monitors the status of the field lighting plant, e.g. such as to ensure that a sufficiently large number of light units function, that the intensity of the light units is correct etc. The supply points, i.e. the cabinets, communicate via a communication link, inter alia with the traffic control tower supervising and operating panel, from which the regulating and supervisory systems are controlled, and at which information from the systems is received. This communication takes place via separate wire pairs for each function, or with time multiplex transmission on wires or optical fibres.

SUMMARY OF THE INVENTION

The object of the present invention is to present a new method for supervising and controlling field lighting, and to provide a new field lighting plant, where each individual lighting is addressable and includes a communicating local regulator and a monitoring unit for supplying power to, and monitoring the lighting. Thus each lighting or subsystem of lightings can be controlled individually, irrespective of the sections into which the power cabling is divided.

Furthermore, the invention enables a presence indication system for detecting vehicle and aircraft movements on the ground to be integrated in the field lighting system implemented in accordance with the present invention.

Communication between the traffic control tower supervision and operating panel takes place via a central computer to a so-called concentrator and loop computer. The communication signals can be in the form of time multiplexed electrical or optical signals on signal cables or optical fibre cables.

A plurality of advantages are achieved by the present invention compared with the already known state of the airport lighting art.

In the implementation of a traditional field lighting system, the different power supply loops are fed via a regulator centrally connected to each loop for regulating the intensity of the lightings connected to the loop. For reasons of safety, the different lighting configurations such as approach lighting, runway edge lighting, glidepath beacons, threshold lighting and taxiway lighting must be fed by several loops in case there should be a regulator or cable fault. A large number of centrally placed regulators are therefore required for controlling the field lighting system, and these occupy large spaces which must often be specially built. With the present invention, on the other hand, each lighting is provided with a local regulator which is placed at the light fitting or in a so-called fitting well associated therewith. At the supply point there will only be a so-called concentrator, sling computer, contactor and modem. This results in less voluminous equipment, which gives savings in space and cost compared with the implementation carried out in a conventional way. In addition, the necessary redundance is obtained automatically with the method of implementation in accordance with the invention.

With a conventional method of implementation there is further required one or more lamp transformers at each lighting. These are heavy and take up considerable space. With the present invention, one or more of these transformers can be replaced by a small and light electronic unit on the fitting for intensity regulation and monitoring each individual lighting.

Since, in accordance with the present invention, each lighting can communicate and is addressable with the aid of its electronic unit, and is thus provided with local intelligence, a lighting with several individual illumination points can control these separately in spite of the supply taking place merely over a single phase or a common cable. The necessary amount of power cable can thus be substantially reduced.

Field lighting plant for airports in accordance with the invention can advantageously be made up of certain modules, namely the lighting electronic unit (hereinafter denoted the AE unit), loop computer, concentrator and modem, where the concentrator and loop computer are realized with the same hardware but with different software, the plant being completed by a central computer and a supervising and operating unit in the traffic control tower (hereinafter denoted TWR). This simple, modular implementation method reduces the hardware costs for a given field lighting plant as well as design costs for a given lighting configuration. Since an ordinary-sized airport has several hundred lightings, the size of the AE unit manufacturing series will be considerable, which considerably reduces the manufacturing cost of each AE unit.

The modular method of implementation means that service and maintenance are facilitated. If an individual lighting does not light, this can either be due to the lamp or the corresponding AE unit failing, or both. In the great majority of cases, it is the lamp that fails, and therefore it is changed first. If a section coupled to a loop computer does not light, this can only be due to failing of the loop computer and modem, and this unit is then changed. Service and maintenance work will thus be extremely simplified, which is an advantage from the time, cost and personnel expects.

With conventionally implemented field lighting systems, there must be an ocular inspection of the field lighting at least once a day to determine which light units are defect. For airports with heavy traffic this must take place at night, since the runway system is not available for inspection during daytime. This results in increased costs. With the present invention this inspection is eliminated, since each lighting is individually monitored and a presentation of the status of each one can be obtained via the sling computer, concentrator and central computer, either on a display or printed out on a printer. In addition, monitoring can take place without the field lighting being lit up, since the AE unit only needs to drive a minimum amount of current through the lamp in order to decide whether it is failing or not. This method saves energy. Each AE unit can furthermore be implemented to enable measuring of the operating time of the light source to which it is connected. Since the average light (illumination time) of the lamps in question is well known, this individual information as to lamp status, namely illumination time and functioning/failing enables planned maintenance of the field lighting plant, which gives better status of the plant and more effective utilization of maintenance personnel. The total illumination time of each light source is suitably continuously registered at e.g. the central computer.

According to an advantageous embodiment of the plant in accordance with the invention, each lighting includes two separate light sources, the lighting configurations of which are identical. Only one light source is in service at a time, but should it fail the other light source is automatically connected, and information is sent that there is no reserve lamp for the lighting.

Since each lighting is addressable in accordance with the present invention, there is the possibility of guiding aircraft, using parts of the field lighting system, for taxiing to and from runways, i.e., to arrange a so-called taxiway guidance system. This can be arranged by the lighting system along the central line of a taxiway being sectioned so that a given section is given a group address. This section can then either have its own operating button in a control tower panel where the section is lit when the appropriate button is pressed, or the central computer in the system can select a path with given input values for the taxiing path of the aircraft, taking into consideration any maintenance work on the taxiway, or to other aircraft movements etc. The decided path can either be lit up simultaneously in its entirety or successively in front of the aircraft. In existing plants this sectioning has been achieved by each section being provided with a separate power supply. With the present invention, the section is performed, with the aid of the AE units' addresses, in the software, which drastically reduces the installation costs for a guidance system, and simplifies any future changes in the section configuration.

The invention can also be used for detecting vehicle and aircraft movements on the ground, i.e. it can form a so-called ground traffic detection system. In airports with heavy traffic, the collision risk between aircraft/aircraft and aircraft/vehicle is namely a great problem in poor visibility conditions. Since the inventive lighting system includes "intelligent" and addressable AE units at each point where there is a lighting, every taxiway and runway can be divided into frequent identification blocks. This inventive implementation of the plan, supplemented with a presence detector allocated to each fitting the complete field lighting system or parts thereof enables detection and supervision of aircraft and vehicle movements along the rolling way system or parts thereof. The signals from the ground traffic detectors are taken up by the AE units and transmitted together with other lighting information via loop computer and concentrator to the central computer, which depicts the ground traffic on a display. The central computer, or a special supervisory computer, can give an alarm for situations where unpermitted ground traffic situations occur. This ground traffic detection system integrated with the field lighting system is very cost-effective compared with existing ground radar systems. The present invention moreover permits that only those parts of the rolling way system selectively chosen from the safety aspect are provided with ground traffic detection capacity, whereby further cost savings can be made.

In accordance with a further advantageous development of the invention, the guidance system is integrated with the ground traffic detection system such that the center line lights included in the guidance system are lit up or extinguished or change lighting color, thereby switching between operating parameters, in front of and after the taxiing aircraft, respectively, lighting up and extinguishing the center line lights taking place individually or in sections with the aid of control signals from the presence detection of the aircraft.

According to another embodiment of.the plant, each lighting position where an AE unit is to be connected is provided with an unique address, which is automatically transferred to the AE unit when the unit is connected, such that this address is tied to its location and is not lost if an AE unit were to be changed.

An advantageous method of realizing an address which is not tied to the AE unit but to its position is to arrange a plurality of permanent magnets in the AE unit mounting such that these magnets have a unique combination of north and south pole orientation, giving the position in question an unique address which is automatically transferred to the AE unit by magnetic field-sensitive elements when the unit is connected. An eight bit address can be realized using eight magnets, for example.

According to a still further advantageous embodiment of the plant, and via the AE unit, the lightings are made for three-phase supply enabling the supply to be dimensioned to cope with a phase failure up to a predetermined current or voltage level. Up to this level all lightings light with no change if there is a phase failure. The central computer can be programmed such as to increase the number of lightings which are extinguished with an increasing modulation in order that the maximum transmitted power for two phases is not exceeded.

BRIEF DESCRIPTION OF THE DRAWINGS

Examples of the invention will now be described in more detail with reference to the accompanying drawings, where.

DETAILED DESCRIPTION

Figure 1:
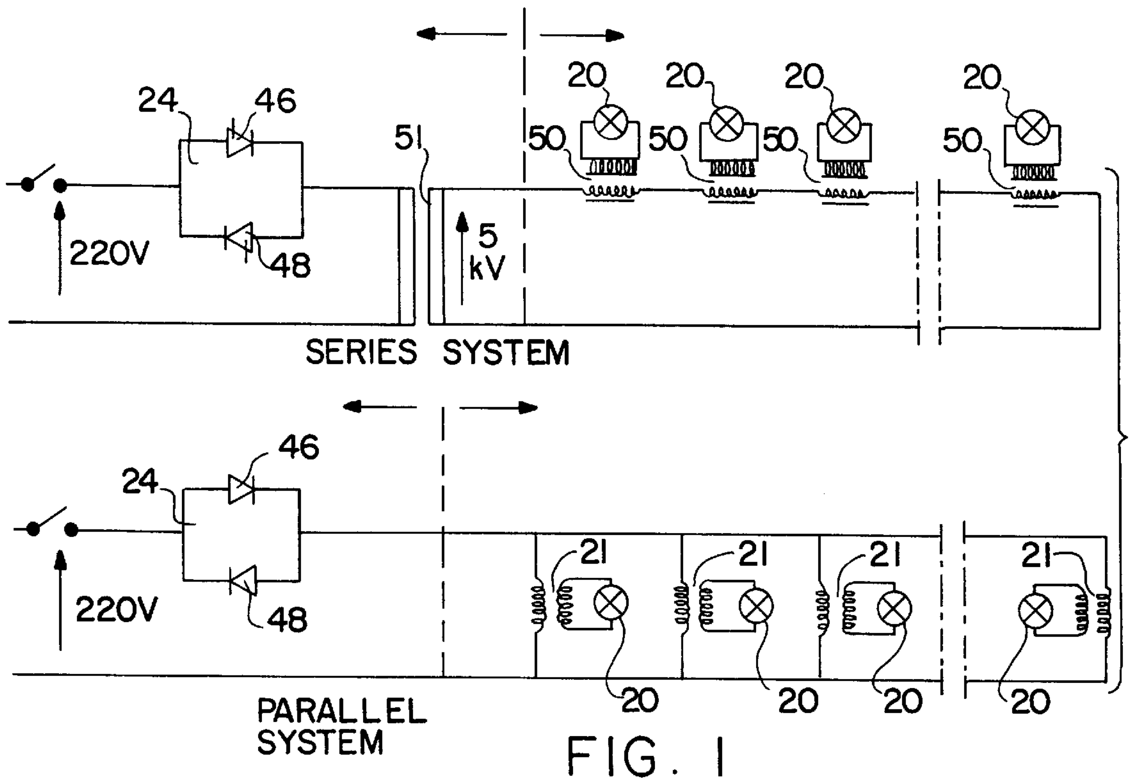
FIG. 1 (PRIOR ART)
FIG. 1 illustrates the two systems in use today for controlling field lighting at an airport.

FIG. 1 illustrates the two different systems used today for controlling the field lighting at an airport. The internationally most usual form is the so-called series system. The power supply line is here fed with a constant current which can be set at different levels. The lightings 20 on the field are connected via a so-called series transformer 50 in series with each other. Two or more such loops are required for supplying each lighting system such as runway edge lighting, approach lighting, glidepath beacons, center line lighting, taxiing lighting etc. Since the lightings 20 are in series there is most often required high secondary voltage at the main transformer 51. The regulator 24 is connected on the primary side. In FIG. 1 it is illustrated as a thyristor regulator 46, 48 but it can also be a transductor regulator or a regulating transformer.

The power supply system most usual in Sweden is the so-called parallel system. In this case the lightings 20 are connected in parallel to each other via their individual transformers 21 along the power supply loop. Transducer regulators or regulator transformers are used here as well, apart from thyristor regulators 24, 46, 48. The control and monitoring equipment, (the equipment to the left of the dashed line in FIG. 1), is often placed in so-called cabinets or stations in the field for these systems. For a medium-sized airport there are usually about 10–15 such regulator units for supplying the different power supply loops included in the field lighting system.

Figure 2:
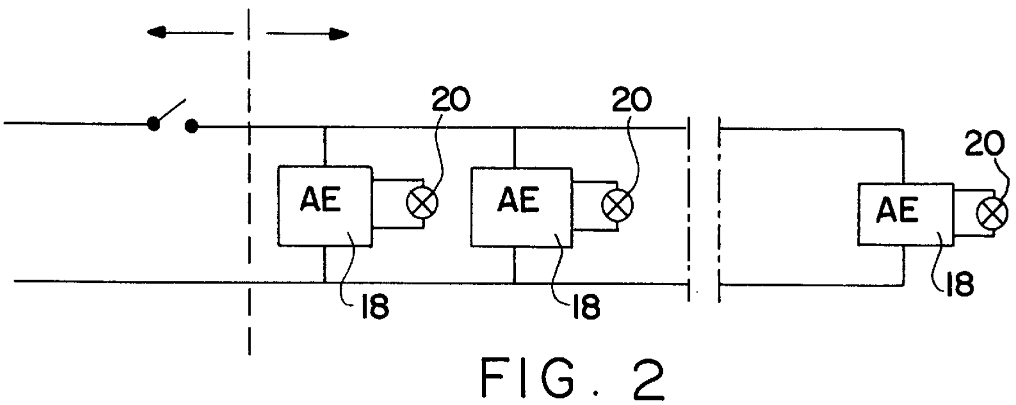
FIG. 2 illustrates the principle implementation of an embodiment of the device in accordance with the invention.

FIG. 2 illustrates in principle the implementation of an embodiment of a plant in accordance with the invention. The power supply loop is here formed of the ordinary power supply, and connected to each lighting 20 there is a so-called lighting electronic unit 18, denoted AE.

Figure 3:
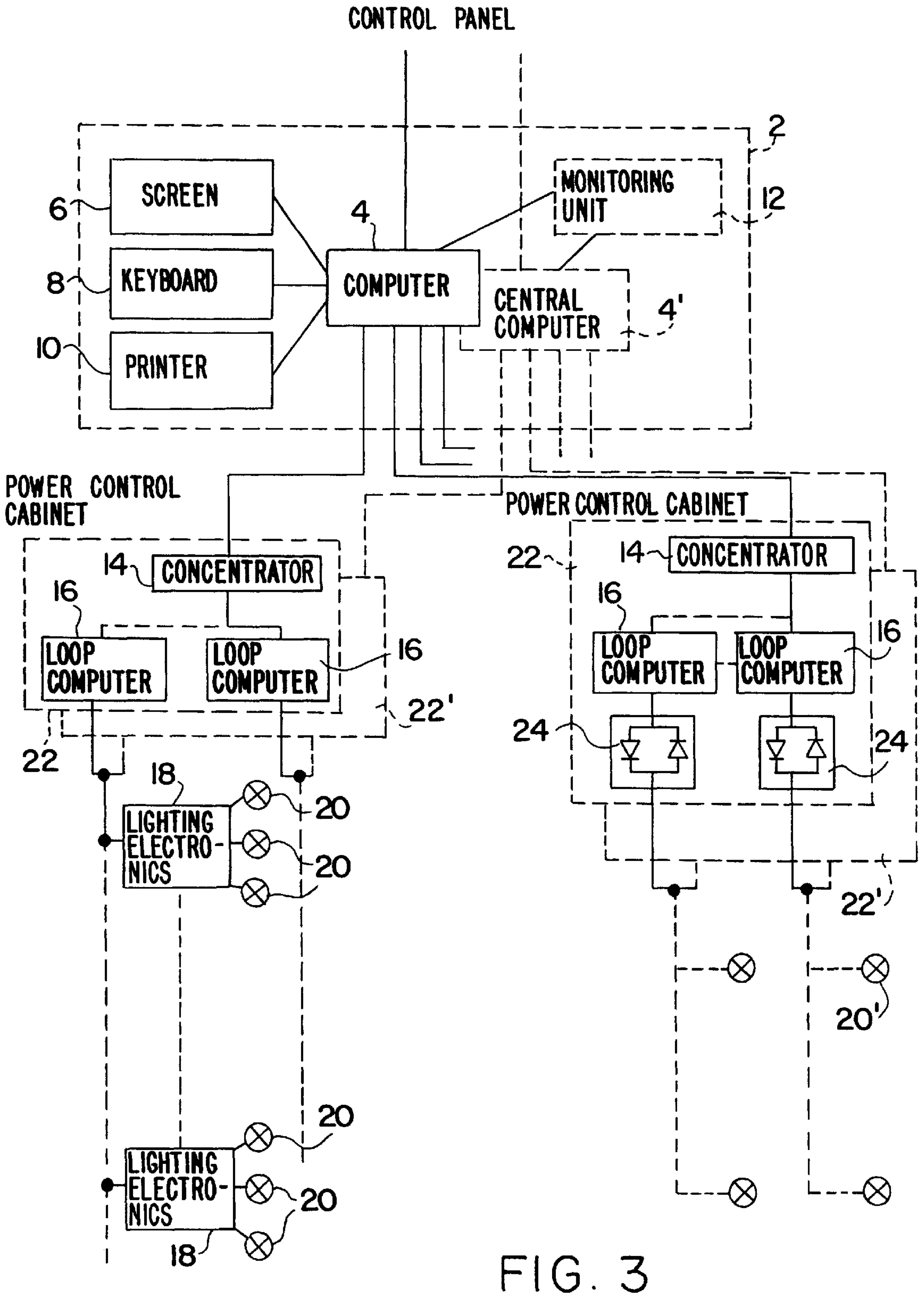
FIG. 3 illustrates the principle system implementation of the system in accordance with the invention.

FIG. 3 illustrates the principle system implementation of a plant according to an embodiment of the invention.

Field lighting installations (existing and future) are controlled and monitored from an operating panel in the airport control tower (TWR). In the invention, a so-called central computer 4 senses the status of the different functions of the operating panel and sends control signals via its control program to one or more so-called concentrators 14. These are most often placed in a so-called power control cabinet 22 at the power supply points for the field lighting. This communication between the central computer 4, most often placed in the apparatus room of the control tower, and the concentrator 14 may be by a time multiplexed signal on cable or optical fibre. Radio signalling can also be used. The concentrator 14 sends its control signals further to one or more loop computers 16. Via a modem communication each loop computer 16 looks after the AE units 18 which are connected to the associated power supply loop. One loop computer can at present communicate with a maximum of 127 AE units, with retention of the necessary rapidity in the system. Communication between the loop computer 16 and the respective AE units 18 along the loop can either take place with digital signals superposed on the power supply loop or via separate signal cable. The most advantageous embodiment appears to be communication via the power cables, no special signal cable thus being required.

Each AE unit 18 monitors the status of the lighting fitting 20 and sends this information to the loop computer 16 in question, for further transmission via the concentrator 14 to the central computer 4, which coordinates the information and gives an alarm when so required. As will be seen from FIG. 3, the status of the plant can also be depicted on a screen 6 with associated keyboard 8 or a printer 10 in the so-called operational supervision center. As further apparent from FIG. 3, this embodiment of the plant in accordance with the invention, with supply to the lightings 20 via AE units 18, permits this new control and monitoring method to be mixed with the conventional technique using series of parallel supply by the power supply loops. The loop computer 16 thus provides a centrally placed regulator 24 with the necessary control signals (criterion values) and it also monitors the regulator 24 so that the right intensity is set and the right loan connected to the loop. This possibility of combining conventional power supply methods with the new technique in accordance with the invention makes the system very flexible.

For meeting functional reliability requirements, the central computer 4 and the power control cabinets 22 can be doubled, as indicated in FIG. 3 by dashed lines. When the central computer 4, 4' and the power control cabinets 22, 22' are doubled, all the cables between the operating panel and the power control cabinets 22, 22' are similarly doubled.

A monitoring unit 12, e.g. of the so-called watchdog type, is connected to both the central computers 4, 4' for monitoring the function of the plant.

Figure 4:
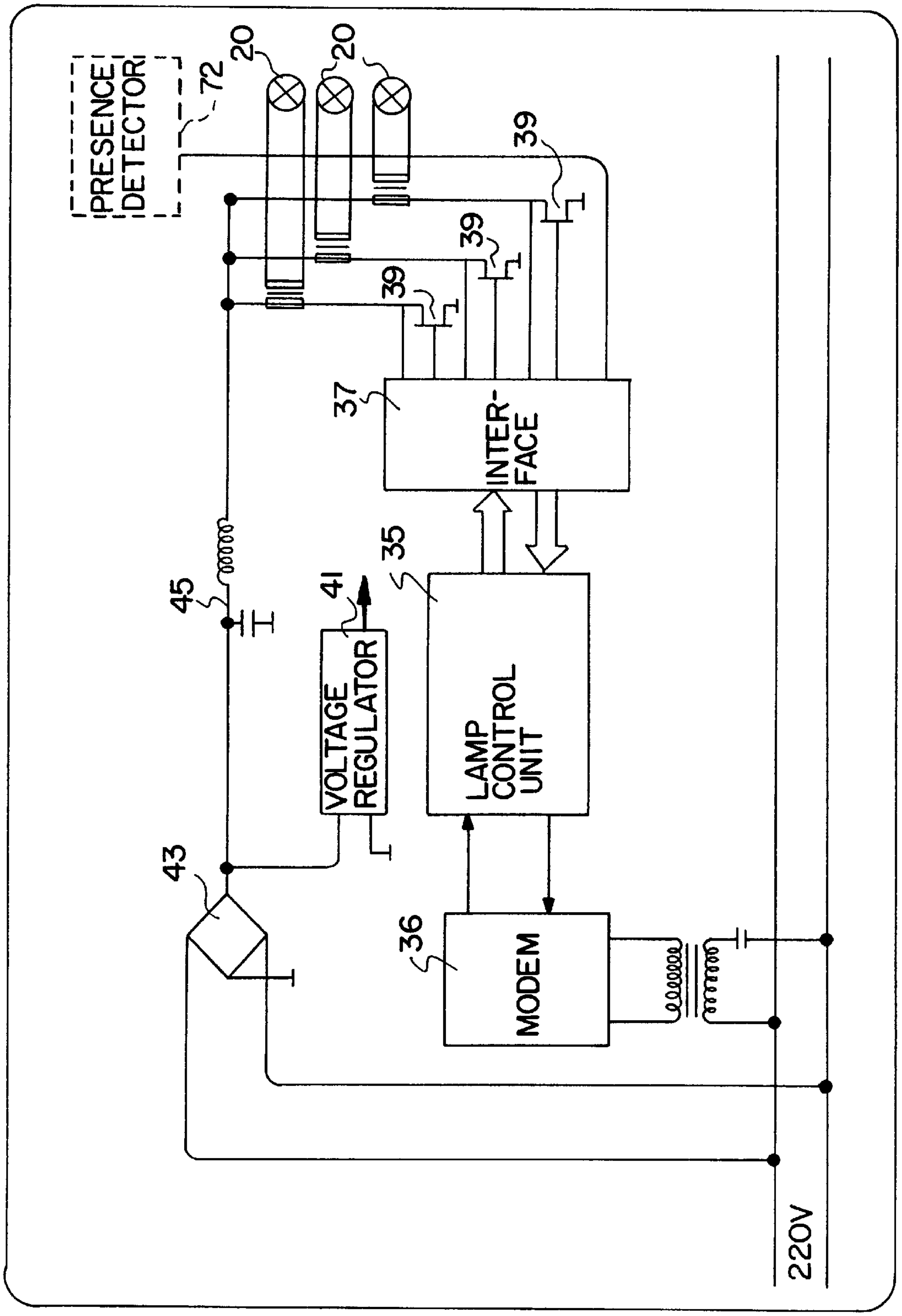
FIG. 4 illustrates an embodiment of the light unit electronics in the inventive plant.

FIG. 4 illustrates an embodiment of the AE unit in the plant in accordance with the invention. This comprises a modem 36 for receiving control signals which are either carried on separate signal cables or are digital signals superposed on the power cabling. The AE unit further includes a lamp control unit 35 with a microprocessor and associated interfaces 37 and power semiconductors 39 for regulating the power supply to the light sources 20. The microprocessor of the lamp control unit 35 also looks after monitoring of the operation so that if incorrect light intensity is set, or if a lamp 20 fails, the AE unit sends information on this to the loop computer 16, c.f. FIG. 3.

Power control in the AE unit can take place according to several different principle methods. FIG. 4 illustrates so-called primary switching, with which, while using high switching frequency, there is obtained extremely small lamp transformers and thereby a very compact construction. Ideally, the transformer decreases in size inversely proportional to the frequency. The frequency is determined here by the construction of the lamp control unit 35 and control can take place, e.g. by pulse length modulation, i.e. the pulse length in the "on position" is greater for higher output effect, and for lower output effect this pulse length become shorter, the switching frequency being constant the whole time.

A voltage regulator 41 is illustrated in FIG. 4 for supplying the electronics. The fitting electronics also includes a rectifier bridge 43 and a filter 45 for preventing noise from the fittings and electronics to propagate to the network.

By each lighting having its individual regulator, at least certain lightings can advantageously be fitted with battery backup, so that for voltage failure the lamp in the lighting continues to light with predetermined intensity.

Figure 5:
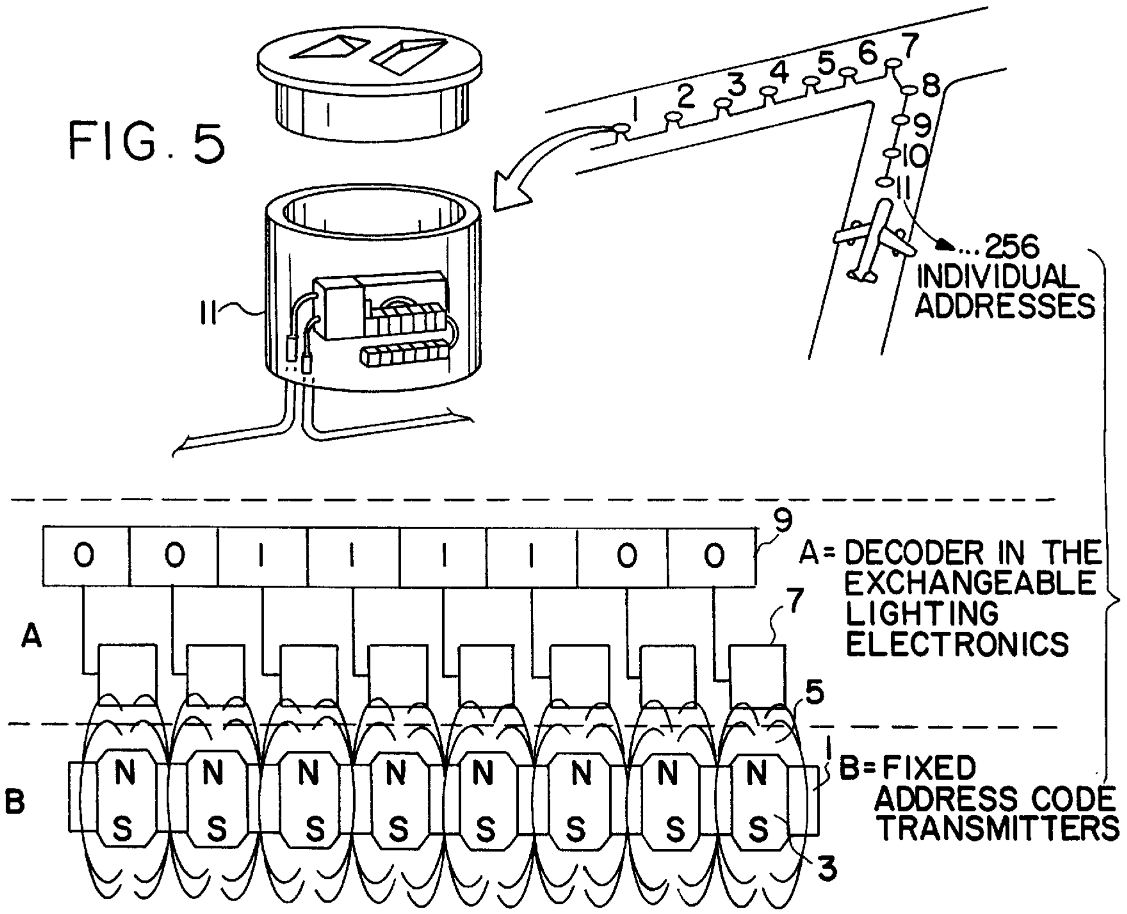
FIG. 5 illustrates an example of how a specific address can be given to each light unit.

Each AE unit has its unique address, as mentioned above. There is thus obtained a possibility of individual control and monitoring of each lighting 20 or section of lightings. FIG. 5 illustrates an advantageous method of achieving this. Permanently situated on the lighting there is a magnetic strip 1 containing the necessary number of permanent magnets 3. The magnets 3 are made as reversible magnet plugs to enable pole reversing. The AE unit contains magnetosensitive elements 7, for sensing the orientation of the north and south poles of the magnets, this orientation enabling a binary address code to be obtained, at 9 in FIG. 5. When the AE unit is positioned it automatically obtains its address, which is permanently associated with the location. This means that each AE unit can be used anywhere in the field lighting system, as far as addressing is concerned, which is advantageous from the point of view of service and maintenance. The embodiment illustrated in FIG. 5 shows how the magnetic field 5 connects the address code from the permanently installed address code transmitter B to an address code decoder A in the lighting electronic unit without galvanic contacts, a signal converter and address transmission unit 11 being connected to the decoder.

It is obviously possible to implement this memory so that the input address is also retained when there is no current, the input taking place with the aid of a special command to start with.

Figure 6:
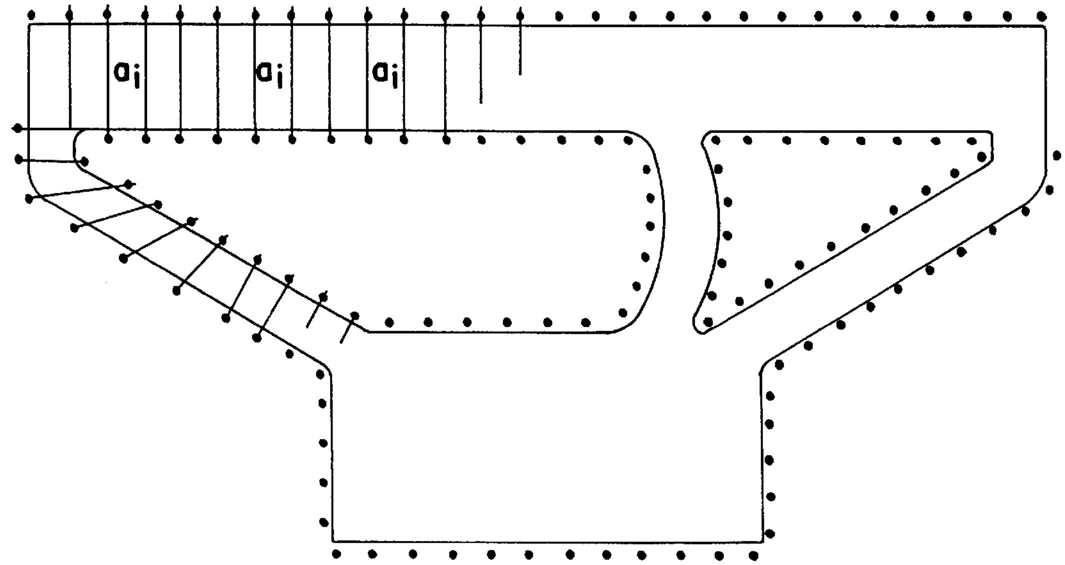
FIG. 6 illustrates the principle of ground traffic detection in the inventive arrangement.
Figure 7:
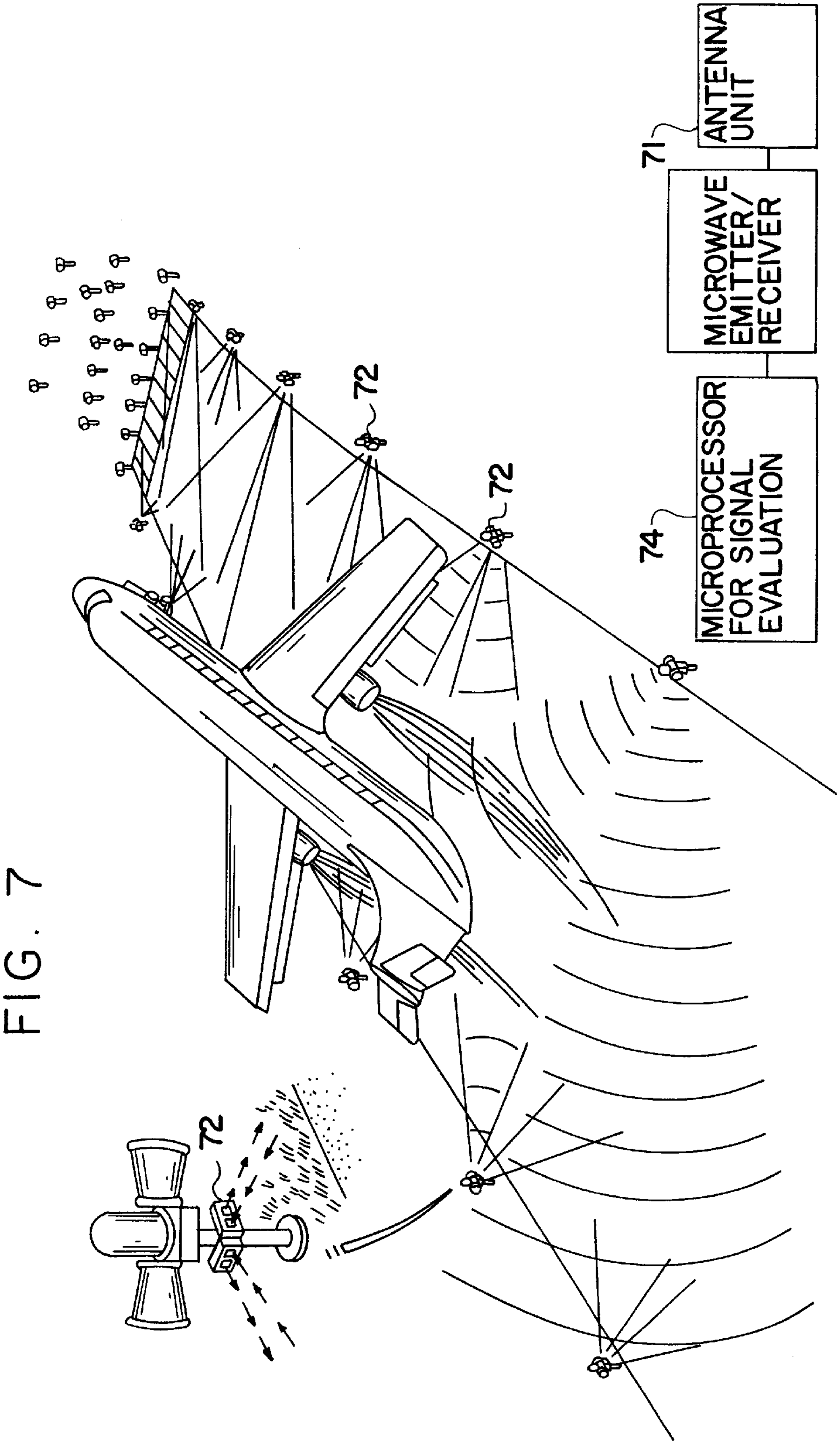
FIG. 7 illustrates an embodiment of the inventive arrangement for microwave-based ground traffic detection.

With the technique in accordance with the invention for controlling and monitoring the field lighting using addressable local regulators there is obtained the field system divided into unique addressing blocks $a_i$, as is illustrated in FIG. 6. By providing the field system with the required number of presence detectors 72, c.f. FIG. 4, a system for detecting vehicle and aircraft ground traffic can be achieved, integrated with the field lighting system. In such a case the presence detector can be placed on a lighting fitting, as illustrated in FIG. 7. Since each fitting has a unique address to which the presence detector signal is correlated, vehicle and aircraft movements on the field can be supervised with the aid of this procedure.

In the illustrated embodiment, the presence detector 72 comprises a microwave based detector. The microwave signals are transmitted and received via an antenna unit 71 and are evaluated at 74. However, the detector can be based on other physical measuring principles using such as supersonics, infrared rays, eddy current etc.

Figure 8:
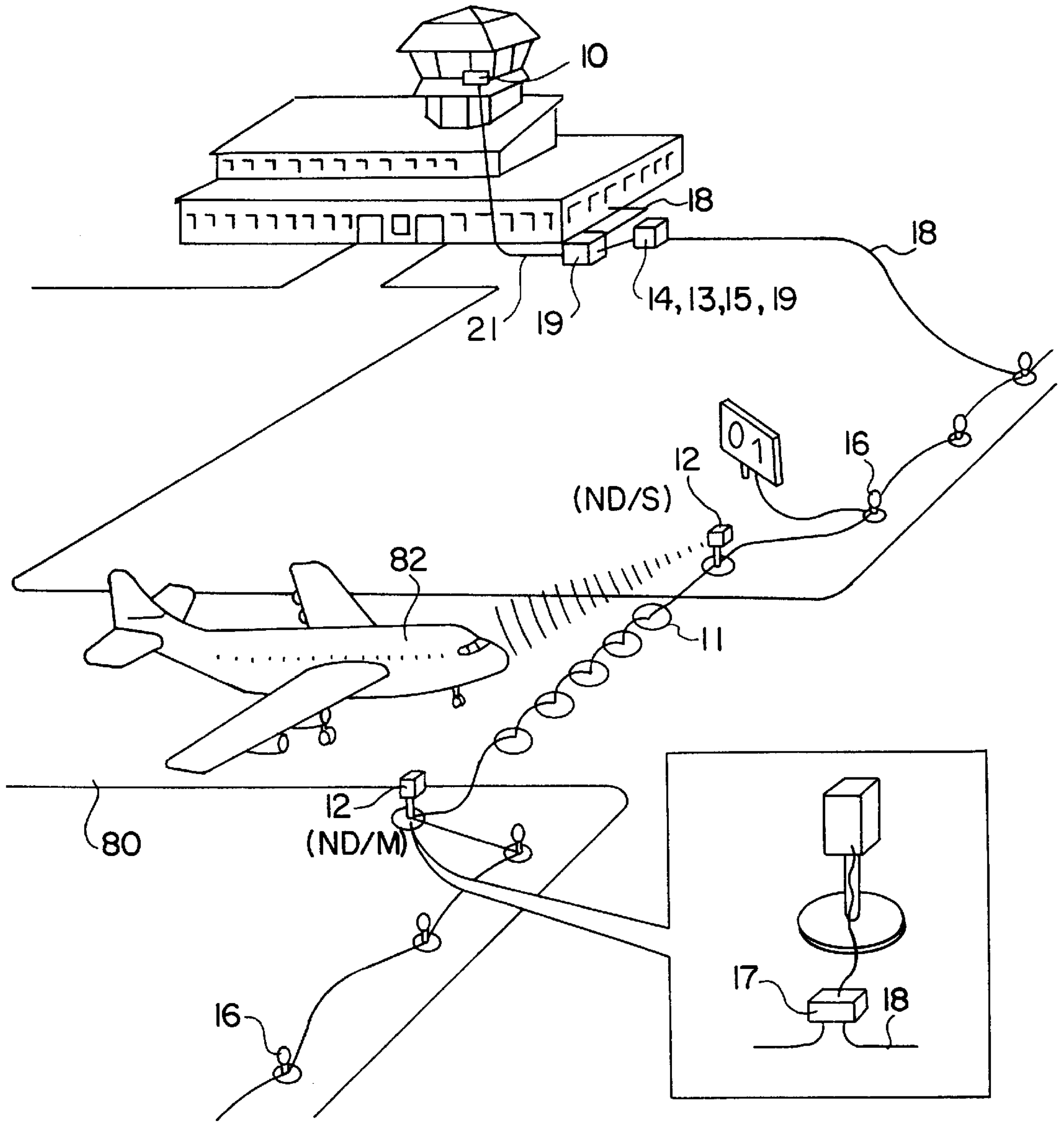
FIG. 8 illustrates a system with stop lights having automatic re-illumination for controlling ground traffic.

In order to control the ground traffic, above all in airports with heavy traffic, stop lights are required at the entrances to runways, and also at crossings between taxiways. Such an arrangement is illustrated in FIG. 8, the stoplights 11 are usually sunk lightings arranged across the taxiway 80, where it suitable to stop the traffic. The stoplights 11 comprise a line of at least 5 light units sunk into the taxiway and providing directed, steady red lights solely for the traffic which is to be stopped (i.e., stop bars). Light ramps included in the stop light system must be enabled for separate operation in the control tower, and the installation of the stop lights should be carried out so that not all light units in such a ramp are extinguished at the same time for failure in the supply system.

The stop lights 11 are controlled such that when an aircraft 82 approaches an illuminated ramp of stop lights, the pilot stops the aircraft and calls the control tower to obtain permission to pass the stoplights. The flying controller gives a clearance sign for passage by extinguishing the stop lights. When the aircraft 82 has passed the lights, they shall be illuminated once again with red light as soon as possible to prevent further aircraft from unintentionally crossing them. This re-illumination takes place either manually or as an automatic sequence. For configurating a stop light ramp with automatic re-illumination, and using the technique known up to now, there are required at least two centrally placed current regulators in order to obtain the separate operation required according to the above, and also to obtain the necessary redundance.

In apparatus of this kind known up to now, the automatic re-illumination is controlled by a separate traffic signal system which, with separate current supply and with separate control signal cables, is connected to the regulator units for the lighting in question. This is an expensive way of controlling and automatically re-illuminating only five light units, for example.

A configuration in accordance with the present invention is illustrated in FIG. 8. Each lighting in the stop lights 11 is provided with an electronic unit AE, which is controlled via the power cables from the loop computer/concentrator 13, 14. Supply can take place as illustrated in the figure, e.g. it can be three-phase supply to obtain great redundance in the supply. The same power supply which is used, e.g. for surrounding illuminated signs, can be used for supplying the stop lights and thus considerably reducing cable costs. A presence detection system is integrated into the configuration for obtaining the automatic re-illumination. In FIG. 8 there is illustrated a microwave-based presence detector 12 with a transmitter ND/S and a receiver ND/M. A fitting electronics unit 17 is connected to the receiver for looking after the signal from the receiver. The signal from the receiver is sent on the cable 18 to the associated loop computer 13, which in turn sends the re-illumination signal to the fitting electronic units of the stop lights. Also schematically illustrated in the figure are the necessary modem 15, way edge lighting 16, a power point 19 and signal cable 21 to an operating the display panel 10 in the control tower.

The described configuration for controlling and automatically re-illuminating the stop lights 11 for aircraft at an airport is substantially cheaper than the configuration according to previously known technique, with.regard to hardware cost and cable cost. In addition there is automatically obtained great redundance, which is important from the safety aspect, a possibility of being able to regulate the intensity of the stop lights being obtained as well.

Figure 9:
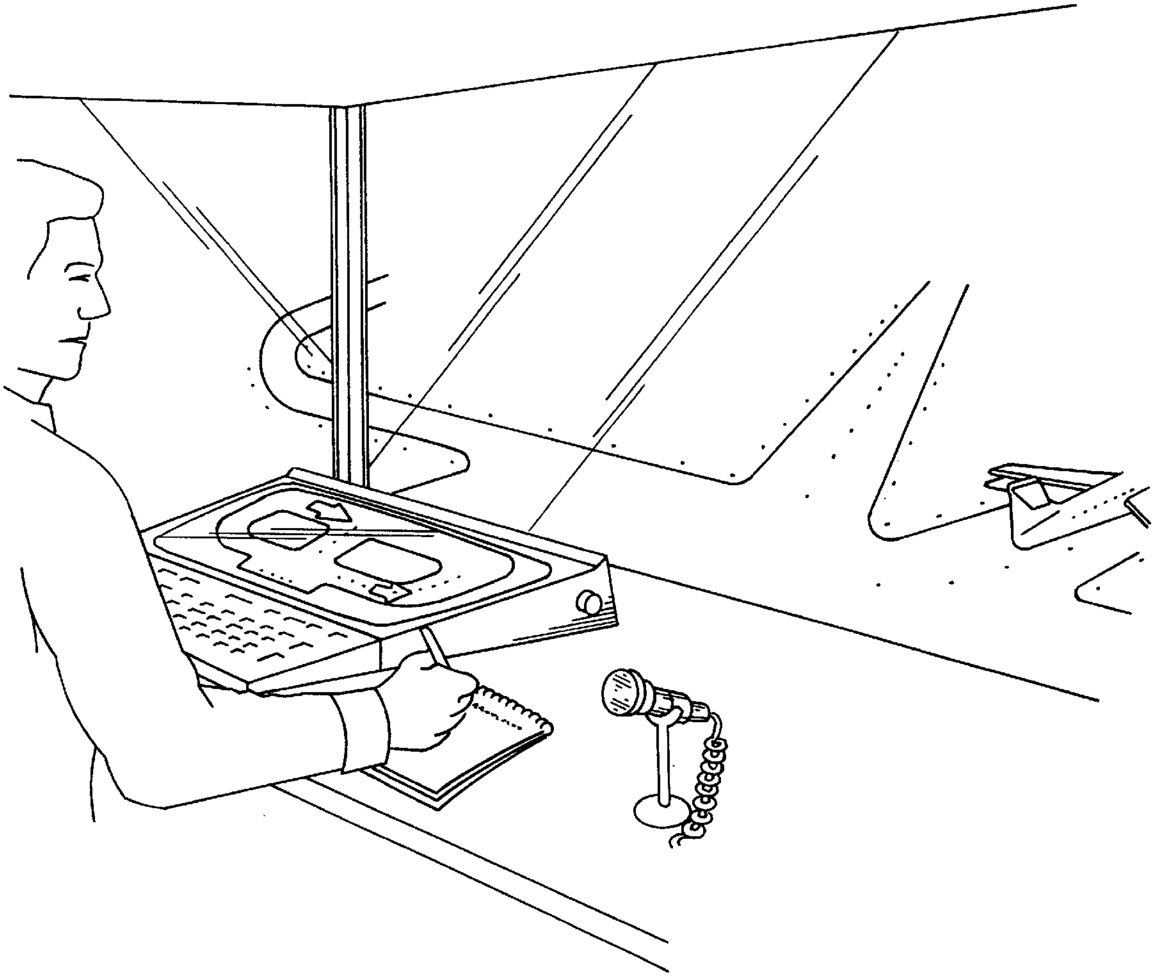
FIG. 9 is an idealized depiction of vehicle and aircraft ground movements.

The system permits vehicle and aircraft movements to be depicted on a monitor in the control tower or at another desired place, see FIG. 9. The described method of detecting ground traffic is very cost effective compared with today's ground radar systems. Such systems also have the disadvantage that in heavy rain and snowfall they cause high background noise, thus causing difficulties in effective supervision. Another advantage with the solution in accordance with this invention is that if the field movement supervision is only desired or required for a small part of the runway system, this can be advantageously achieved.

Figure 10:
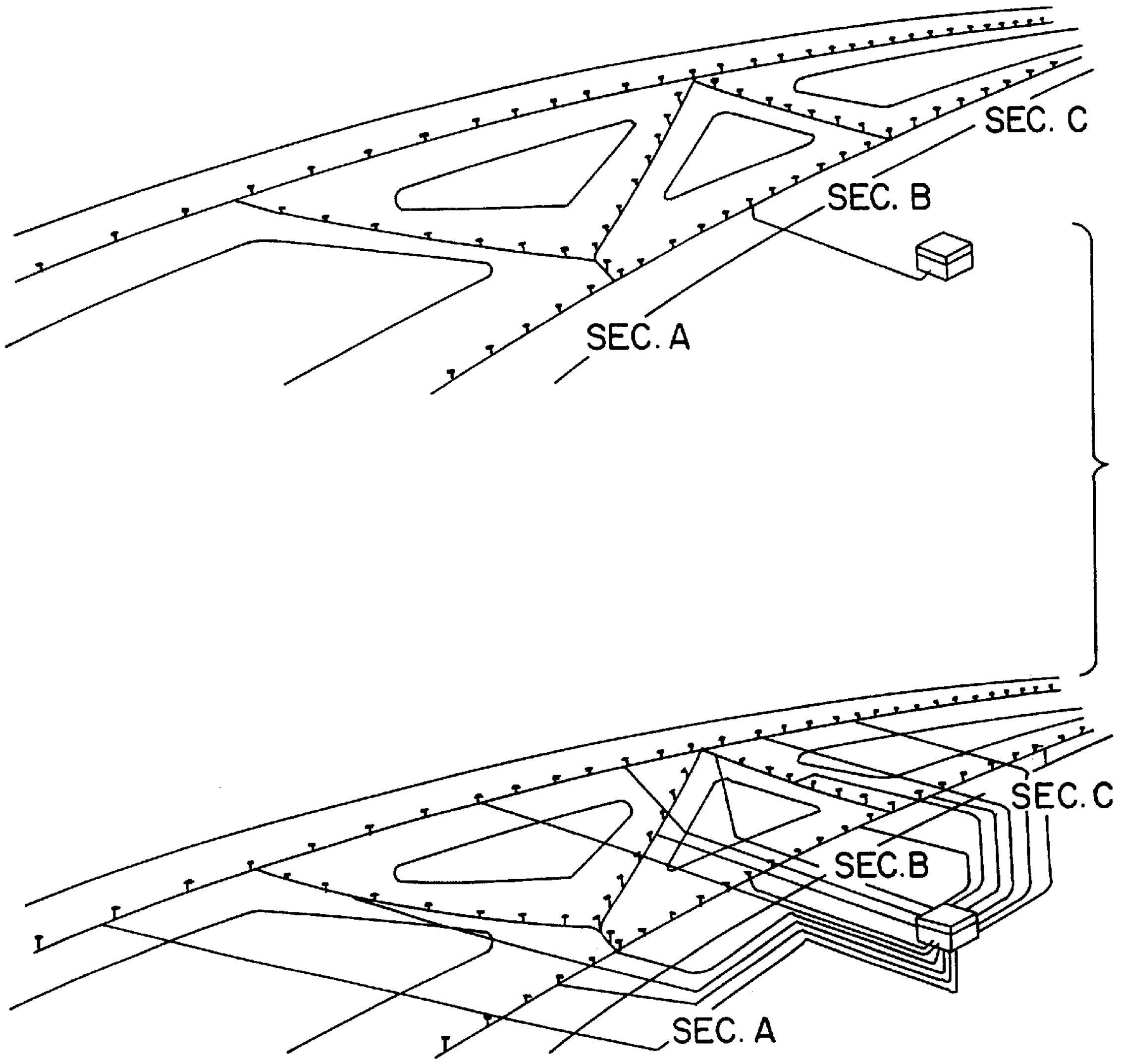
FIG. 10 illustrates a conventional guidance sytem and a guidance system according to the invention.

At airports with the most heavy traffic in the world today, so-called guidance systems have been built up to guide aircraft when taxiing to and from runways, see FIG. 10. The lower part of the figure illustrates how such a system is built up today. This is done by the power supply to the lightings in question being sectioned so that each section can be lit up and extinguished individually. A large amount of cable is required for this, as well as many centrally placed regulators. With the present invention having addressable regulators, the sectioning is done in the software. Different sections of lightings can thus be connected to the same power supply cable, and merely by defining what lighting addresses are associated with a certain section the section in question can be lit up and extinguished individually. This configuration results in large cost savings, see the upper part of FIG. 10.

What is claimed is:

1. A monitoring and control system for an airfield, comprising:

a plurality of lighting means positioned at remote locations about the surface of said airfield;

a central computer remotely located from said plurality of lighting means;

power distribution means connecting said plurality of lighting means to a source of electrical energy;

interface means connected to receive control signals for at least one of said plurality of said lighting means from said central computer and to transmit monitoring data concerning said lighting means to said central computer, said interface means being connected for controlling said plurality of lighting means independently by use of a unique address for each lighting means, and using said power distribution means for transmitting light control signals and receiving light monitoring data from said plurality of lighting means; and light controlling and monitoring means connected between said power distribution means and at least one of said plurality of lighting means for receiving said light control signals from said interface means for operating said at least one of said plurality of lighting means and for transmitting light monitoring data to said interface means using said power distribution means.

2. The monitoring and control system of claim 1, further including motion sensors associated with said lighting means, said motion sensors being electronically interconnected with said central computer by means of said light controlling and monitoring means for detection of moving traffic on the surface of said airfield.

3. The monitoring and control system of claim 1, wherein said lighting means are capable of operating under a plurality of different operating parameters and wherein said operating parameters of said lighting means are varied such that said lighting means are at least one of lit up and extinguished in response to said control signals.

4. The monitoring and control system of claim 1, wherein said lighting means are capable of operating under a plurality of different operating parameters and wherein said operating parameters of said lighting means are varied to provide intensity regulation.

5. The monitoring and control system of claim 1, wherein said lighting means are capable of operating under a plurality of different operating parameters and wherein said operating parameters of said lighting means are switched to display stop bars on said airfield surface.

6. The monitoring and control system of claim 1, wherein said lighting means are capable of operating under a plurality of different operating parameters and wherein said operating parameters of said lighting means are switched to display center lines on said airfield surface.

7. The monitoring and control system of claim 1, wherein said lighting means are capable of operating under a plurality of different operating parameters and wherein said operating parameters of said lighting means are switched to display discrete sectional areas on said airfield surface.

8. A method for monitoring and controlling a system for an airfield, comprising the steps of:

providing a plurality of lighting means positioned at remote locations about the surface of said airfield;

providing a central computer remotely located from said plurality of lighting means;

connecting power distribution means between said plurality of lighting means and a source of electrical energy;

connecting interface means for receiving control signals for at least one of said plurality of said lighting means from said central computer and for transmitting monitoring data concerning said lighting means to said central computer, said interface means being connected for controlling said plurality of lighting means independently by use of a unique address for each lighting means, and using said power distribution means for transmitting light control signals and receiving light monitoring data from said plurality of lighting means; and connecting light controlling and monitoring means between said power distribution means and at least one of said plurality of lighting means for receiving said light control signals from said interface means for operating said at least one of said plurality of lighting means and for transmitting light monitoring data to said interface means using said power distribution means.

9. The method of claim 8, further including the step of transmitting signals from said central computer to motion sensors associated with said lighting means to enable selective addressing of said motion sensors and to control the operation of said motion sensors for detecting moving traffic on the surface of said airfield.

10. The method of claim 8, wherein said lighting means are capable of operating under a plurality of different operating parameters and wherein said operating parameters of said lighting means are varied such that said lighting means are at least one of lit up and extinguished in response to said control signals.

11. The method of claim 8, wherein said lighting means are capable of operating under a plurality of different operating parameters and wherein said operating parameters of said lighting means are varied to provide intensity regulation.

12. The method of claim 8, wherein said lighting means are capable of operating under a plurality of different operating parameters and wherein said operating parameters of said lighting means are switched to display stop bars on said airfield surface.

13. The method of claim 8, wherein said lighting means are capable of operating under a plurality of different operating parameters and wherein said operating parameters of said lighting means are switched to display center lines on said airfield surface.

14. The method of claim 8, wherein said lighting means are capable of operating under a plurality of different operating parameters and wherein said operating parameters of said lighting means are switched to display discrete sectional areas on said airfield surface.

* * * * *